United States Patent [19]

Schwarz

[11] 4,116,892
[45] Sep. 26, 1978

[54] PROCESS FOR STRETCHING INCREMENTAL PORTIONS OF AN ORIENTABLE THERMOPLASTIC SUBSTRATE AND PRODUCT THEREOF

[75] Inventor: Eckhard C. A. Schwarz, Neenah, Wis.

[73] Assignee: Biax-Fiberfilm Corporation, Neenah, Wis.

[21] Appl. No.: 614,018

[22] Filed: Sep. 17, 1975

Related U.S. Application Data

[63] Continuation-in-part of Ser. No. 563,623.

[51] Int. Cl.$^2$ .................. C08L 67/06; C08L 23/12; B29D 27/00; B29C 17/02
[52] U.S. Cl. .................. 521/62; 260/42.46; 260/873; 260/897 A; 264/49; 264/154; 264/288; 264/289; 264/344; 264/DIG. 47; 428/401; 428/910; 521/50; 521/139; 521/91; 521/134
[58] Field of Search ............... 264/288, 289, DIG. 47, 264/DIG. 73, 145, 154, 49, 344, 232; 28/DIG. 1; 260/2.5 N, 2.5 HA, 2.5 R, 42.46, 873, 897 A; 428/401, 910

[56] References Cited

U.S. PATENT DOCUMENTS

| | | | |
|---|---|---|---|
| 3,257,488 | 6/1966 | Rasmussen | 264/289 |
| 3,466,358 | 9/1969 | Muller | 264/287 |
| 3,470,290 | 9/1969 | Poris et al. | 264/289 |
| 3,517,098 | 6/1970 | Rasmussen | 264/DIG. 47 |
| 3,574,809 | 4/1971 | Fairbanks et al. | 264/289 |
| 3,639,573 | 2/1972 | Port | 28/DIG. 1 |
| 3,775,521 | 11/1973 | Yamamoto et al. | 264/289 |
| 3,849,526 | 11/1974 | Mullen et al. | 264/289 |

*Primary Examiner*—James B. Lowe
*Attorney, Agent, or Firm*—Marn & Jangarathis

[57] ABSTRACT

There is disclosed a novel process and product produced thereby for the selective stretching of incremental portions of a substrate of a synthetic thermoplastic material selected from the group consisting of a thermoplastic orientable polymer or a blend of a thermoplastic orientable copolymer in which there is admixed an incompatible second phase selected the group consisting of an incompatible polymer or inorganic material. The substrate is stretched in grooved roller pairs by controlling the velocity of introduction of the substrate to maintain the velocity substantially identical to the surface velocity of the roller pair. Stretching of the blends produce an opaque, low density porous sheet.

16 Claims, 5 Drawing Figures

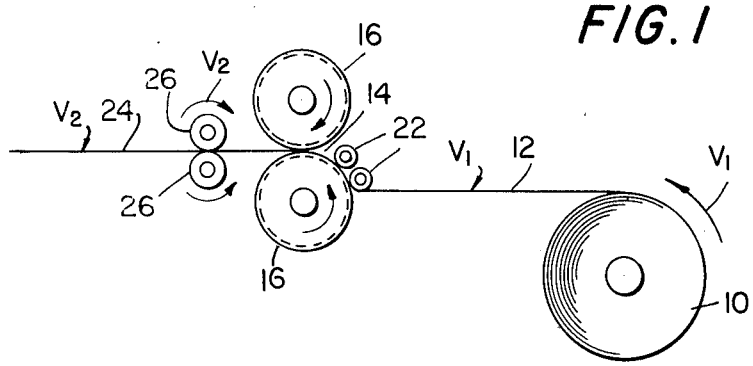
FIG. 1
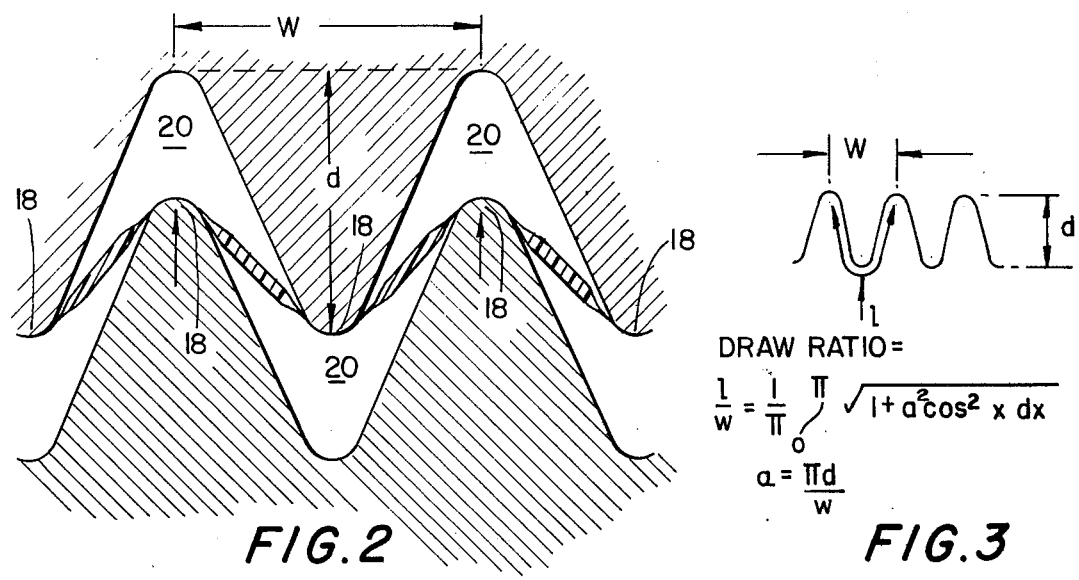
FIG. 2
DRAW RATIO =
$$\frac{l}{w} = \frac{1}{\pi}\int_0^\pi \sqrt{1+a^2\cos^2 x}\, dx$$
$$a = \frac{\pi d}{w}$$
FIG. 3
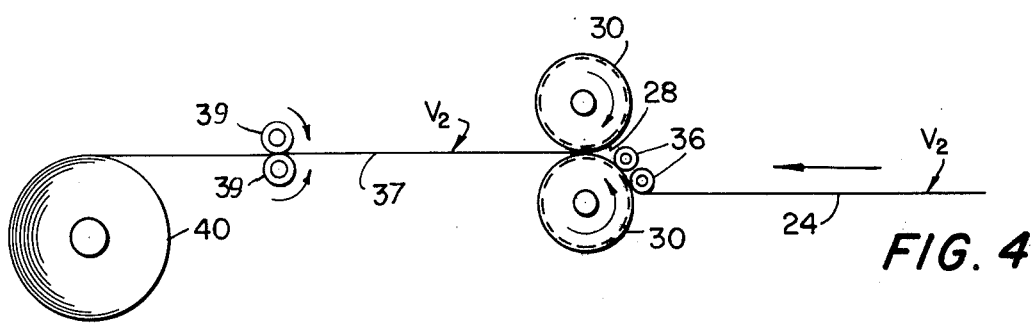
FIG. 4
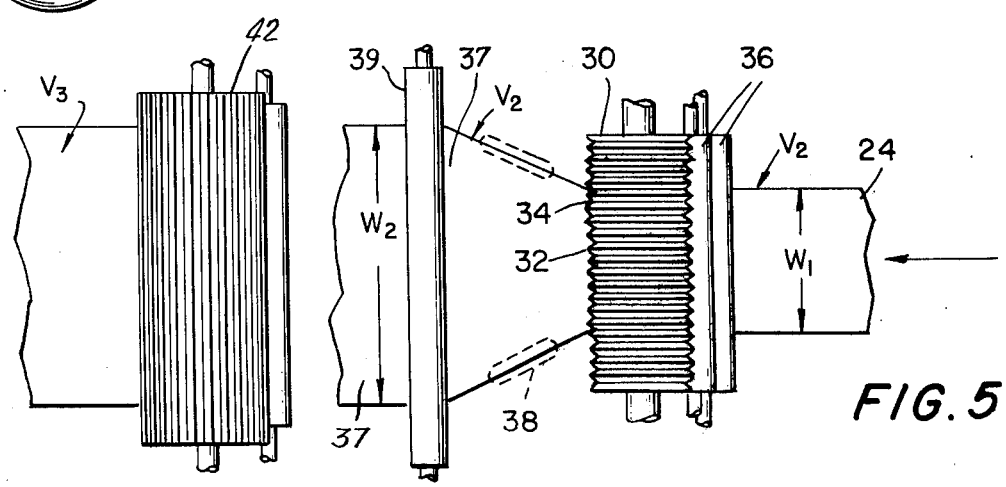
FIG. 5

PROCESS FOR STRETCHING INCREMENTAL PORTIONS OF AN ORIENTABLE THERMOPLASTIC SUBSTRATE AND PRODUCT THEREOF

This invention is a continuation-in-part of my copending application Ser. No. 563,623 filed Mar. 31, 1975.

This invention relates to a novel process for stretching a film of synthetic thermoplastic polymer or blend thereof, and more particularly to a novel process for stretching incremental portions of such a film to produce an opaque, low density, porous sheet of film.

BACKGROUND OF THE INVENTION

Such an opaque, low density, porous sheet or film is useful as a printing substrate, such as synthetic paper; as a substitute for leather; as a highly fibrillated sheet which can easily be shredded into fine fibrils to be used as substitutes for paper-making pulps, or as a filter material, such as battery separators.

Many polymeric materials or especially blends thereof are known to undergo fibrillation and/or pore formation upon stretching or drawing. A number of such blends are described in U.S. Pat. Nos. 3,697,367 to Schwarz and 3,511,742 to Rasmussen. Such pore formation may result from different causes, such as separation of phases of incompatible polymer blends, or separation of inorganic polymer fillers like clay or titanium dioxide from the polymer matrix due to stress concentration. Most common in such systems is that the maximum pore formation effect occurs at a draw temperature which is relatively low for the particular polymer system. When the same polymer or blend thereof is stretched at higher temperatures, the pore formation diminishes and a denser film results.

At temperatures where pore formation occurs accompanied by a decrease in density, the draw tension also increases. Draw tension or yield strain also increases with increasing draw rate or operating speed, and reaches the breaking strength of the base film at speeds which are slow and uneconomical for conventional systems used for stretching or drawing of films. Operating a conventional stretching system, such as longitudinal stretching by Godet rolls and lateral stretching by tenter frames, under tensions which approach the breaking strength of the base film often causes breaks and frequent interruptions of the process. Extrusion speeds are uneconomically slow: for instance, an acceptable draw rate of 200 cm/min in a single longitudinal draw step over Godet rolls for a 90 wt% isotatic polypropylene – 10 wt% polystyrene (See Example 1), would limit the extrusion rate (for a 3 foot linear die at a draw ratio of 2.0 and a film thickness of 100 micron) to 23.2 lb/hr.

The process heretofore advanced for making porous films are plagued, inter alia, by low production rates, low yields, nonuniform quality, etc.

OBJECTS OF THE INVENTION

It is an object of the present invention to provide a novel process for stretching a film of synthetic thermoplastic orientable polymer and blends thereof.

Another object of the present invention is to provide a novel process for stretching a film of synthetic thermoplastic orientable polymer and blends thereof at economical production rates.

Still another object of the present invention is to provide a novel process for stretching a film of synthetic thermoplastic orientable polymer and blends thereof to produce an opaque, low density, porous film or sheet.

Various other objects and advantages of the present invention will become apparent from the following detailed description of an exemplary embodiment thereof with the novel features thereof being particularly pointed out in the appended claims.

SUMMARY OF THE INVENTION

In accordance with the present invention, there is provided a novel process for selective stretching incremental portions of a film of a synthetic thermoplastic material selected from the group consisting of a thermoplastic orientable polymer or a blend of a thermoplastic orientable polymer with an incompatible second phase selected from the group consisting of an incompatible polymer or inorganic material in a station provided with a set of grooved rollers to form an opaque, low density, porous film. The groove pattern of the rolls is generally of a sinosoidal wave wherein the film is stretched in a manner to affect uniform stretching between contact points of the material to produce a material of larger dimension in the direction of stretch.

In accordance with a preferred embodiment of the present invention, there is provided a process for biaxially stretching such a film in a first and second station wherein the first and second stations are provided with sets of rolls having grooves parallel and perpendicular, respectively, to the axis of each set of rolls. The film of synthetic material is stretched in a manner to affect uniform stretching between contact points to produce an opaque low density porous sheet.

In a particularly preferred embodiment, a plurality of stations are arranged in a preselect manner, as determined by product requirements, e.g. a multiplicity of sets of rollers having parallel grooves, etc.

BRIEF DESCRIPTION OF THE DRAWINGS

The invention will be more clearly understood by reference to the following detailed description of an exemplary embodiment thereof in conjunction with the accompanying drawings wherein FIG. 1 is a schematic side elevational view of a first station of the apparatus and process of the present invention;

FIG. 2 is an enlarged view of the film entering the rolls;

FIG. 3 graphically illustrates a sinosoidal curve;

FIG. 4 is a schematic side elevational view of a second station; and

FIG. 5 is a top view of the second station followed by another first station.

DETAILED DESCRIPTION OF THE INVENTION

Drive and support assemblies, timing and safety circuits and the like known and used by those skilled in the art have been omitted in the interest of clarity.

Referring to FIG. 1 illustrating the first station of the process and apparatus of the present invention, there is provided a supply roll 10 on which is mounted a film 12 of a synthetic thermoplastic material selected from the group consisting of a thermoplastic orientable polymer or a blend of a thermoplastic orientable polymer with an incompatible second phase selected from the group consisting of an incompatible polymer or inorganic material. The film 12 is coursed between a nip 14 of a pair of rolls 16 having a plurality of tips 18 forming grooves 20 parallel to the axis of the rolls 16, schematically illustrated by a dotted line in FIG. 1, as more clearly seen in FIG. 2. The film 12 is maintained against the lower grooved roll 16 by a pair of press rolls 22 to ensure that the velocity $V_1$ of the film 12 is substantially identical to the surface velocity $V_1$ of the grooved rolls 16. The grooves 20 of the rolls 16 are intermeshed like gears, as known to those skilled in the art. As the film 12 enters the nip 14, the film 12 assumes the shape of the grooves 20 and is stretched (See FIG. 2) by a factor determined by the length of the sinus wave "$l$" (See FIG. 3) of the groove divided by the distance "$w$" between contact points of each respective groove tip, since the film 12 is prevented from slipping by the press rolls 22 to prevent the introduction of more material, as is more commonly practiced in the corrugating art.

The draw ratio ($l/w$) is calculated by the following equation:

$$l/w = 1/\pi \sqrt{1 + a^2\cos^2 x}\, dx$$

where, $a = \pi d/w$; and $d =$ groove depth. Thus for $d/w$ ratios of 1.0, 0.75, and 0.5 the draw ratios are 2.35, 2.0 and 1.6, respectively. The longitudinal draw rate is defined by the following equation:

$$\text{draw rate} = V_2 - V_1$$

where
 $V_1 =$ film velocity entering rolls; and
 $V_2 =$ film velocity leaving rolls.

The Actual Draw Rate (ADR) for longitudinal or lateral stretching is calculated by the following equation:

$$ADR = \frac{(\text{draw ratio} - 1)V}{4\, d/w \sqrt{R/D - 1/4}}$$

where,
 $d =$ groove depth;
 $w =$ distance between tips;
 $l =$ length of sinosoidal wave;
 the draw ratio $= l/w$;
 V is the velocity of the film entering the nip of the rollers; and R is the radius of the rollers.

The roller speed can be calculated as follows:

$$V = \frac{ADR \cdot 4\, d/w \sqrt{R/d - 1/4}}{\text{draw ratio} - 1}$$

Thus if the critical ADR for a composition operating at about 80% of breaking tension is 100 cm/min., and $d/w = 1$, draw ratio is 2.25, R is 10 cm. and $d = 0.3$ cm., then $V_1 = ADR \cdot 18.41 = 1841$ cm/min., which is 18.41 times faster than permissible with Godet rolls. For a 6 inch wide film die making 4 mil. film, an extrusion rate of 565 lbs/hr. can be obtained vice 30.4 lbs/hr.

The film 24 after passage through the nip 14 of the rolls 16 is pulled away by a pair of tension rollers 26 having a surface velocity $V_2$ greater than the surface velocity of the rollers 16, but not greater than a factor of the draw ratio affected in the nip 14 of the rollers 16. In accordance with the present invention, the length of film is therefore increased by this factor.

It is noted that the film does not undergo narrowing while being longitudinally stretched or extended, as is the case with conventional roller systems. It is apparent to one skilled in the art that the film may sequentially pass through a plurality of pairs of grooved rollers 16 to further stretch lengthwise the film 24.

Referring now to FIG. 4, the longitudinally stretched film 24 from the first station is introduced into a nip 28 formed by a pair of rolls 30 having a plurality of tips 32 forming grooves 34 parallel to the circumference of the rolls 30 in a second station of the apparatus. The film 24 is caused to be coursed into the nip 28 by a pair of press rolls 36 which holds the film 24 against the lower roll 30 to thereby prevent the film 24 from narrowing prior to introduction. Once in the nip 28, the film 24 assumes the shape of the groove pattern (See FIG. 2) and becomes laterally stretched by a factor of the draw ratio determined in a manner similar to the draw ratio discussed with reference to FIG. 1.

The crimp pattern is flattened-out by stretching the sheet 36 laterally by means of tenter clamps or curved Mount Hope rolls, generally indicated as 38, such as known and used by one skilled in the art.

In the second station, i.e., after lateral stretching, the sheet 37 is passed through rollers 39 at about the same velocity ($V_2$) as the feed velocity ($V_2$) with the product being collected on a roll 40. For best results, the longitudinal and lateral stretching steps are repeated alternately through multiple passes each having a relatively low draw ratio, until the total permissible draw ratio is reached. The number of longitudinal and lateral passes, as well as the extent of the stepwise draw ratios, can be chosen so that a final film is obtained with the desired properties. FIG. 5 illustrates the film 37 being further coursed into a set of rolls 42 having grooves parallel to the axis for further longitudinal stretching, similar to the stretching of FIG. 1.

EXAMPLES OF THE INVENTION

Operation of the process and apparatus is described in the following examples which are intended to be merely illustrative and the invention is not to be regarded as limited thereto.

EXAMPLE I 90 parts by weight of isotactic polypropylene (commercial Profax 6423) of melt flow rate of 6 gram/10 min. and 10 parts by weight of polystyrene (Dow's Styron 685) were dry blended and extruded as a mixture into a homogenous film through a 6 inch flat film die at 450° F. on a rotating metal drum to form a film 100 microns thick and having a 93 gram/m.² basis weight. The film appeared clear with a slight haze. Strips 6 inches long and 1 inch wide were stretched in an Instron tensile tester equipped with an oven to heat the samples between the clamps. Samples were stretched to break at various temperatures as shown in Table 1. The yield strain, which stayed approximately constant between 20 and 300% elongation, was measured at the point of 200% elongation. During stretching, the samples necked down to a width of about ½ inch. Yield strain was measured in:

$$\frac{\text{gram/linear m strain}}{\text{gram/m.}^2 \text{ basis weight of original film}}$$

From Table 1 it may be seen that at low temperatures where void formation due to internal fibrillation occurred (which produces lower density and opacity), the yield strain is quite high and close to the level of the breaking strength. At higher temperature, yielding occurred at a lower strain, breaking strength and elongation at break was higher, but the opacifying effect lost.

Table I

| Stretch Temperature °C. | Yield Strain m. | Breaking Strength m. | Elongation at break % | Density g/cm.$^3$ | Appearance |
|---|---|---|---|---|---|
| 25 | 7400 | 8100 | 380 | 0.62 | white, opaque |
| 40 | 6300 | 9200 | 430 | 0.66 | white, opaque |
| 60 | 4600 | 9400 | 470 | 0.75 | slightly opaque |
| 80 | 2350 | 12900 | 550 | 0.88 | hazy |
| 100 | 1950 | 13400 | 650 | 0193 | almost clear | clamp span distance: 10 cm
stretch rate: 40 cm/min = 400%/min.

EXAMPLE II

The base film of Example I is stretched as in Example I at 25° C. to form a low density opaque film. The stretch rate is varied to show the effect of stretch rate to yield strain. At a stretch rate of 200 cm/min. or 2000%/min. the yield strain increased so much that it came close to the breaking strength indicating that a commercial process under these conditions would become critical to operate. Data are summarized in Table 2:

Table 2

| Stretch rate cm/min. | yield strain m. | breaking strength m. | Elongation break % | density after stretch g/cm. |
|---|---|---|---|---|
| 40 | 7430 | 8120 | 380 | 0.62 |
| 100 | 7640 | 8100 | 390 | 0.62 |
| 200 | 7920 | 8030 | 250 | 0.58 |
| 300 | | immediate break, no stretching | | |

EXAMPLE III

Example II is repeated at an oven temperature of 60° C. It can be seen from Table 3 that yield strain increased as the stretch rate increased, somewhat higher stretch rates are possible than at 25° C., density is higher and opacity somewhat lower than at 25° C.

Table 3

| Stretch rate cm/min. | yield strain m. | Breaking strength m. | Elongation at break% | density g/cm$^3$ |
|---|---|---|---|---|
| 40 | 6300 | 9200 | 470 | 0.75 |
| 100 | 6450 | 9250 | 430 | 0.75 |
| 200 | 7510 | 9050 | 380 | 0.68 |
| 300 | 8150 | 8850 | 380 | 0.65 |

EXAMPLE IV

Film as produced in Example I is introduced through a pair of grooved rolls (as shown in FIG. 1). The grooves have an approximate sinosoidal shape and are 3mm. deep and 3mm. apart and produce a draw ratio or about 2. When the film is stretched to conform with the shape of the grooves, 8 groove tips simultaneously engage the film. The film is introduced into the nip of the intermeshing grooved rolls rotating at 60 RPM to produce a feed velocity $V_1$ of 1914 cm./min., and is wound at 3828 cm./min. The actual film draw rate is 120 cm./min. The film has opaque lines at 3 mm. intervals corresponding to the contact points with undrawn clear sections in between.

EXAMPLE V

A set of grooved rolls having grooves 1 mm. deep and 2 mm. apart (draw ratio of 1.4) rotating at 180 RPM=5742 cm./min. stretches a film (as produced in Example I) and is wound at 8039 cm./min. This produces an actual draw rate of 162 cm./min. The resulting film shows opaque white lines about every 2 min. with clear undrawn sections in between. This Example illustrates that stretching can be effected at low draw ratios at high operating speeds.

EXAMPLE VI

The stretched film of Example V is passed through the grooved rolls of Example III three more times under identical conditions to produce a total draw ratio of 3.84. The film shows groove marks but the clear sections have disappeared. The film has a tensile strength in the stretch direction of 27500 m. and an elongation at break of 32% indicating that stretching has been almost complete. The basis weight of the opaque sheet is 26 grams/m$^2$ at a thickness of 40 micron, and thus a density of 0.65 grams/cm$^3$.

EXAMPLE VII

The stretched film of Example VI is passed through the grooved rolls two more times as described in Example VI. The film starts to tear due to overdrawing and appears to be highly fibrillated and possesses almost no strength in the cross direction. Strips ¼ inch wide are cut vertical to the stretch direction and 5 grams of such clippings are stirred in a high speed Waring blender with 500 milliliter of water for 5 minutes. The film has disintegrated into a finely fibrillated pulp consisting of fibers of about 0.1 micron to 50 microns thick and 100 to 6000 micron long.

EXAMPLE VIII

Polypropylene (Profax 6423 of the Hercules Powder Co. Inc.) is compounded in a Banbury mixer with 10% by weight of "OX-1" clay of the Freeport Kaolin Co. with the molten mixture thereafter pelletized in a conventional pelletizing Extruder. OX-1 clay is a grade which has been treated to be compatible with hydrofobic resins such as polyolefins as described in U.S. Pat. No. 3,697,474. The blend is extruded as described in Example I to a film 150 micron thick and 6 inches wide. The film appears hazy, but almost transparent, since the refractive indices of clay and polypropylene do not significantly differ. The film, when stretched cold, becomes opaque due to a fibrillating effect initiated by the dispersed clay particles accompanied by a decrease of density of the opaque film indicating the formation of voids. When the film is stretched at high temperature, stretch tension decreases and opacity is not formed.

| Stretch Temperature °C | Yield Strain m. | Breaking Strength m. | Elongation at Break% | Density gm/cm³ |
|---|---|---|---|---|
| 25 | 11570 | 19600 | 650 | 0.66 |
| 60 | 8070 | 25700 | 750 | 0.82 |
| 110 | 4060 | 27650 | 850 | 1.06 |

(Instron conditions as in Example I).
clamp span distance 10 cm., stretch rate: 40 cm./min.

EXAMPLE IX

The polypropylene/clay film of Example VIII is drawn through the nip of a pair of grooved rolls (as described in Example IV) having grooves 3 mm. deep and 3 mm. apart rotating at a speed of 60 RPM=1914 cm./min. The resulting film had opaque lines every 3 mm. corresponding to the groove contact points with clear sections in between. The draw ratio at this groove shape is about 2.0, and the film is wound at twice the feed velocity. The actual draw rate is 120 cm./min. The speed of the rolls is generally increased to 200 RPM or 6384 cm./min. whereat the film started to rupture severely along the opaque lines. The actual draw rate at this point is 399 cm./min.

EXAMPLE X

The polypropylene/clay film of Example VIII is drawn through the nip of a pair of grooved rolls having grooves parallel to the roll axis 1 mm. deep and 2 mm. apart (as described in Example V) and subsequently through a pair of rolls having grooves 1 mm. deep and 2 mm. apart vertical to the roll axis. This resulted in a longitudinal stretch and subsequent lateral stretch by a factor of 1.4 in each direction. The second pair of grooved rolls is operated at 84 RPM. Before winding, the sheet is flattened out over a series of curved Mount Hope rolls. Longitudinal and lateral stretching is repeated two more times. The resulting film is then stretched biaxially 2.7 times in each direction and is now completely opaque. After calendering between a pair of smooth rolls at 60° C., the basis weight was 21 gram/m², reduced from an original 155 gram/m². Groove marks at right angles were still visible and gave the opaque film a woven cloth-like appearance.

EXAMPLE XI

A polyethylene terephthalate of 0.9 intrinsic viscosity and a general purpose polystyrene of melt index 12.0 are blended in a weight ratio of 7 to 3 and extruded through a flat film die to a 16 mil film of 505 gram/m² basis weight. A 10 × 10 inch piece is passed through a pair of grooved rolls having grooves parallel to the roll axis 3 mm. deep and 3 mm. apart. After the line embossing pattern has been flattened out by a pair of smooth calander rolls, the sheet has a size of 10 × 16 inch, indicating an actual draw ratio of 1.6. Subsequently the sheet is passed through the grooved rolls (at 30 RPM) turned 90°, thus applying a biaxial stretch ratio of 1.6 × 1.6. The process is repeated once more to a total biaxial draw ratio of 2.56 × 2.56. The sheet is now drawn out to a size of about 26 × 26 inch, appearing highly opaque and having a basis weight of 76 gram/m². The sheet is then treated with boiling-toluene to dissolve the polystyrene. The resulting polyester sheet is porous, has a fibrous structure and a soft, leather-like feel.

While the present invention has been described with reference to the passage of a film through a first longitudinal stretching station and thence a lateral stretching station, it is apparent that such stations may be altered with the film being first introduced into a lateral stretching station. Further, the film may be subjected to a plurality of longitudinally orientated stretching rolls. It will also be appreciated that the grooves need not be exactly parallel or perpendicular as long as the grooves intermesh.

It will be appreciated that the grooved roll drawing permits multiple simultaneous draw necks which allow for further actual speed where draw tension is high. At high draw tension (low temperature), the fibrillation phenomenon occurs which is highly desirable for porous films. Additionally, the grooved roll drawing permits a partial draw (draw below the natural draw ratio) in multiple stages thereby further reducing the actual draw rate and increasing the production rate. Still further defects in the base film, i.e., gels, holes, etc. are carried through the grooved roll drawing with no interruption in the process as distinguished from drawing in conventional Godet and tenter frame drawing wherein such defects usually result in breaks and the necessity for subsequent shutdown.

While the invention has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

What is claimed is:

1. A process for longitudinally stretching incremental portions of a film of synthetic thermoplastic material selected from the group consisting of a thermoplastic orientable polymer or a blend of thermoplastic orientable polymers in which there is admixed an incompatible second phase material selected from the group consisting of an incompatible polymer or inorganic material which comprises:
   (a) introducing said film into a nip of interdigitating rollers having grooves substantially parallel to the axis of said rollers;
   (b) controlling the velocity of introduction of said film into said nip to assume and maintain the velocity substantially identical to the surface velocity of said rollers to prevent slipping of said film and thereby longitudinally stretch incremental portions of said film by a deflection of said film into the shape of said grooves; and
   (c) collecting the thus formed sheet.

2. The process as defined in claim 1 wherein the withdrawal velocity is not greater than a factor of the draw ratio of said nip of interdigitating rollers.

3. The process as defined in claim 2 wherein steps (a) and (b) are repeated to a point below the break point of said film.

4. The process as defined in claim 3 wherein the resulting product is cut into strips and subjected to agitation to form fibers.

5. The process as defined in claim 1 wherein said incompatible phase is contacted with a selective solvent to dissolve said phase.

6. The product produced by the process of claim 4.

7. A process for bi-axially stretching incremental portions of a film formed of synthetic thermoplastic material selected from the group consisting of a thermoplastic orientable polymer or a blend of thermoplastic orientable polymers in which there is admixed an incompatible second phase material selected from the group consisting of an incompatible polymer or inorganic material which comprises:
- (a) introducing said film into a nip of interdigitating rollers having grooves parallel to the axis of said rollers;
- (b) controlling the velocity of introduction of said film into said nip to assume and maintain the velocity substantially identical to the surface velocity of said rollers to prevent slipping of said film and thereby longitudinally stretch incremental portions of said film by deflection of said film into the shape of said grooves;
- (c) withdrawing said film from said rollers at a velocity greater than the rotational velocity of said rollers;
- (d) introducing said film into a nip of interdigitating rollers having grooves substantially perpendicular to the axis of said rollers;
- (e) controlling the velocity of introduction of said web into said nip to assume and maintain the velocity substantially identical to the surface velocity of said rollers to prevent narrowing of said film prior to introduction into said nip thereby to laterally stretch incremental portions of said web by deflection of said film into shape of said grooves;
- (f) withdrawing said web from said rollers at a velocity substantially corresponding to the velocity of introduction and;
- (g) collecting the thus stretched film.

8. The process as defined in claim 7 wherein the steps (a) to (f) are repeated prior to step (g).

9. The process as defined in claim 7 wherein steps (d) to (f) are affected prior to steps (a) to (c).

10. The process as defined in claim 7 including the steps of selecting said incompatible polymer as said incompatible phase and contacting said stretched film with a selective solvent to dissolve said incompatible phase.

11. The opaque, low density, porous film produced by claim 10.

12. The process as defined in claim 7 including the steps of selecting said inorganic material as said incompatible material and contacting said stretched film with a solvent to dissolve said inorganic material.

13. The opaque, low density, porous film produced by the process of claim 12.

14. The process as defined in claim 1 wherein said film is withdrawn from said interdigitating rollers at a velocity greater than the surface velocity of said rollers to pull said film away from said interdigitating rollers.

15. A process for stretching incremental portions of a film formed of synthetic thermoplastic material selected from the group consisting of a thermoplastic orientable polymer or a blend of thermoplastic orientable polymers in which there is admixed an incompatible second phase material selected from the group consisting of an incompatible polymer or inorganic material which comprises:
- (a) introducing said film into a nip of interdigitating rollers having grooves substantially perpendicular to the axis of said rollers;
- (b) controlling the velocity of introduction of said film into said nip to assume and maintain the velocity substantially identical to the surface velocity of said rollers to prevent narrowing of said film prior to introduction into said nip thereby to laterally stretch incremental portions of said film by deflection of said film into the shape of said grooves; and
- (c) collecting the thus laterally stretched film.

16. The process as defined in claim 15 wherein said stretched film is laterally extended prior to step (c).

* * * * *